United States Patent
Brauner

(10) Patent No.: US 9,356,719 B2
(45) Date of Patent: May 31, 2016

(54) METHODS OF PROCESSING A RADIO FREQUENCY SIGNAL, SIGNAL PROCESSING DEVICES FOR CARRYING OUT THE METHODS, RADIO FREQUENCY FRONT-ENDS, RADIO RECEIVERS AND GNSS RECEIVERS

(71) Applicant: u-blox AG, Thalwil (CH)

(72) Inventor: Thomas Brauner, Zurich (CH)

(73) Assignee: u-blox AG, Thalwil (CH)

( * ) Notice: Subject to any disclaimer, the term of this patent is extended or adjusted under 35 U.S.C. 154(b) by 566 days.

(21) Appl. No.: 13/765,250

(22) Filed: Feb. 12, 2013

(65) Prior Publication Data

US 2014/0176364 A1 Jun. 26, 2014

(30) Foreign Application Priority Data

Dec. 24, 2012 (EP) .................................. 12405129

(51) Int. Cl.
| | | |
|---|---|---|
| *G01S 19/36* | (2010.01) | |
| *G01S 19/09* | (2010.01) | |
| *H04J 3/02* | (2006.01) | |
| *G01S 19/33* | (2010.01) | |

(52) U.S. Cl.
CPC . *H04J 3/02* (2013.01); *G01S 19/33* (2013.01); *G01S 19/36* (2013.01)

(58) Field of Classification Search
CPC .......... G01S 19/09; G01S 19/36; G01S 19/37
USPC ............... 342/357.4, 357.46, 357.76, 357.77; 370/537, 542
See application file for complete search history.

(56) References Cited

U.S. PATENT DOCUMENTS

| | | | | |
|---|---|---|---|---|
| 5,375,146 A | * | 12/1994 | Chalmers ...................... | 375/350 |
| 5,818,883 A | * | 10/1998 | Smith et al. ................... | 375/347 |
| 7,860,189 B2 | * | 12/2010 | Petilli et al. ................... | 375/316 |

FOREIGN PATENT DOCUMENTS

EP 2214033 A2 8/2010

OTHER PUBLICATIONS

European Patent Office Search Report for EP Application EP 12405129 dated Apr. 2, 2013.

* cited by examiner

*Primary Examiner* — Dao Phan
(74) *Attorney, Agent, or Firm* — Edward B. Weller

(57) ABSTRACT

A radio frequency signal is frequency-translated to form a complex first intermediate signal where a frequency corresponding to a GPS center frequency is at an intermediate frequency. In a multiplexing conversion unit a complex multiplexed conversion signal which assumes different conversion frequencies is derived from a clock signal where the frequency of the latter is divided alternately by one of two divisors in a divider circuit and further by two in a phase shifter. The conversion signal is mixed with the first intermediate signal in a conversion mixer to provide a multiplexed second intermediate signal where, depending in each case on the conversion frequency, a frequency corresponding to a GLONASS center frequency and a frequency corresponding to a BeiDou center frequency are alternately shifted close to the intermediate frequency. The first intermediate signal and the second intermediate signal are then processed in a baseband unit.

21 Claims, 9 Drawing Sheets

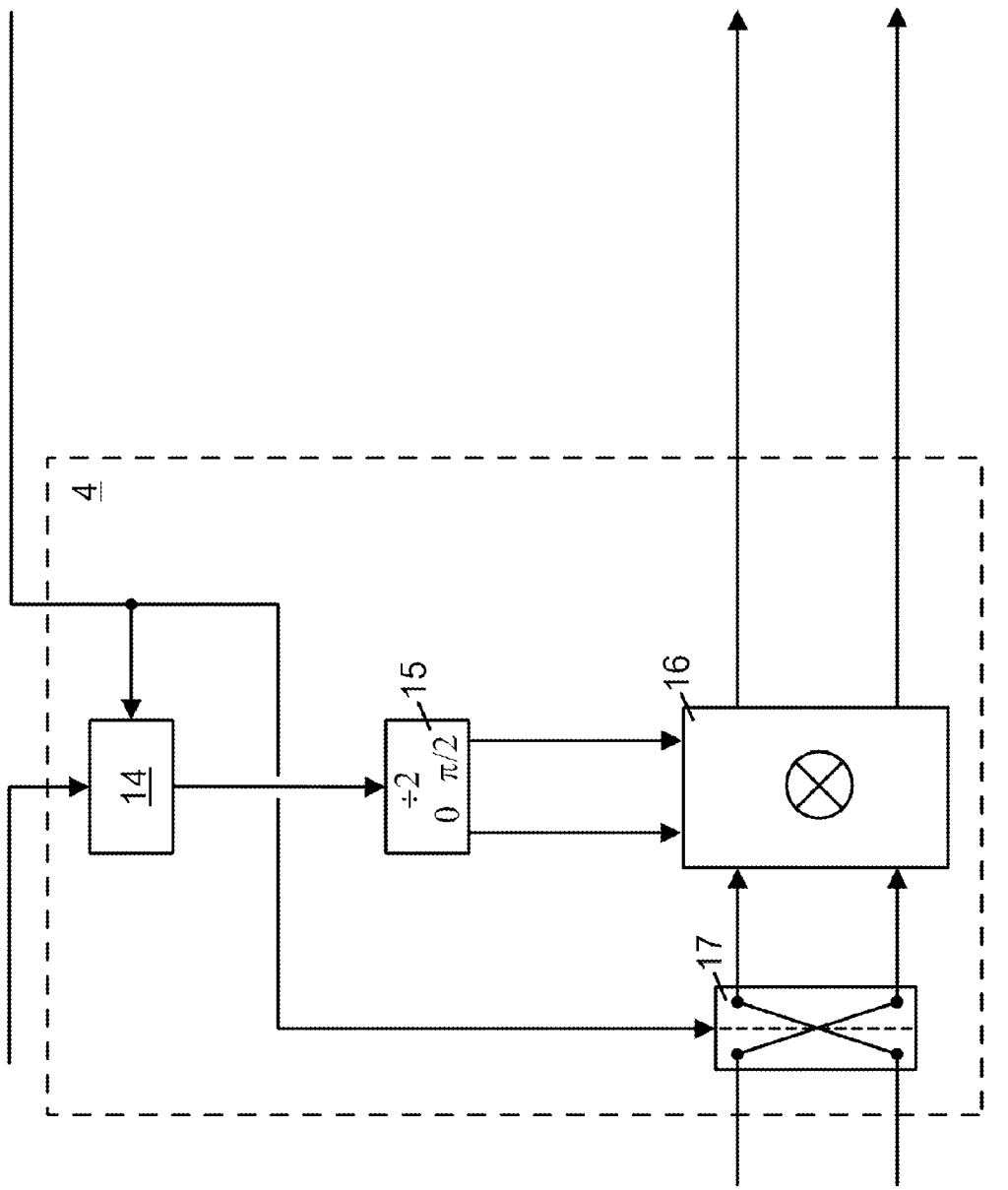

METHODS OF PROCESSING A RADIO FREQUENCY SIGNAL, SIGNAL PROCESSING DEVICES FOR CARRYING OUT THE METHODS, RADIO FREQUENCY FRONT-ENDS, RADIO RECEIVERS AND GNSS RECEIVERS

RELATED APPLICATIONS

This application claims the benefit of priority under 35 USC §119 to European Patent Application 12405129.3 filed on Dec. 24, 2012, the entire contents of which are incorporated herein by reference.

FIELD

The disclosure relates to methods of processing a radio frequency signal, signal processing devices for carrying out the methods, radio frequency front-ends of radio receivers comprising such signal processing devices, and radio receivers comprising such radio frequency front-ends.

BACKGROUND

A method, signal processing device, front-end and Global Navigation Satellite System (GNSS) receiver of the generic type are known from, e.g., European Patent Application EP 1 983 351 A1, the entire contents of which are incorporated herein by reference. The method and devices are suitable for processing a signal restricted to a fixed frequency band as is the case with the Global Positioning System (GPS) signal which is a superposition of signals transmitted by the satellites pertaining to the GPS system. However, relying solely on the GPS signal can, particularly in special situations, be insufficient for determining a receiver position with a desired reliability and degree of precision. Quite often it may not be possible to receive signals from a sufficient number of satellites. In urban canyons, for instance, reception is often restricted to a rather small solid angle which may not contain a sufficient number of satellites. But even where the view of the sky is unobstructed, it may not be possible to receive signals from four or more different satellites as is usually required for a stand-alone determination of the receiver position. This is particularly true at high latitudes where, on average, fewer satellites are visible than in mid latitude and equatorial regions. But even where a sufficient number of satellites are visible, they may form a constellation, e.g., a cluster, which does not allow for a precise determination of the receiver position.

SUMMARY

The quality of the positioning may often, particularly in the cases mentioned above, be significantly improved by processing, in addition to signals from GPS satellites, signals from satellites pertaining to alternative systems like GLONASS and BeiDou, which use different frequency bands. In some embodiments, a method provides, apart from a basic signal like the GPS signal, at least two further signals transmitted on different frequency bands that are processed in a way which does not demand extensive additional hardware and causes only a moderate increase in power consumption.

In some embodiments, by processing further frequency bands of interest alternately and multiplexing between them without losing phase coherence, a plurality of different signals, in particular, GLONASS and BeiDou signals, is used within a single additional receiver channel and is available for evaluation together with the GPS signal.

It should be noted that the same method and devices may be used in other fields of interest as well, e.g., wireless communication.

The disclosure also pertains to a signal processing device suitable for carrying out the method as well as a radio frequency front-end comprising a signal processing device of this kind and a receiver, in particular, a GNSS receiver, comprising such RF front-end.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

In the following the invention is described in more detail with reference to drawings showing embodiments of the disclosure where FIG. 7 illustrates a multiplexing conversion unit of the RF front-end according to a second embodiment in a second state.

DETAILED DESCRIPTION

Figure 1:
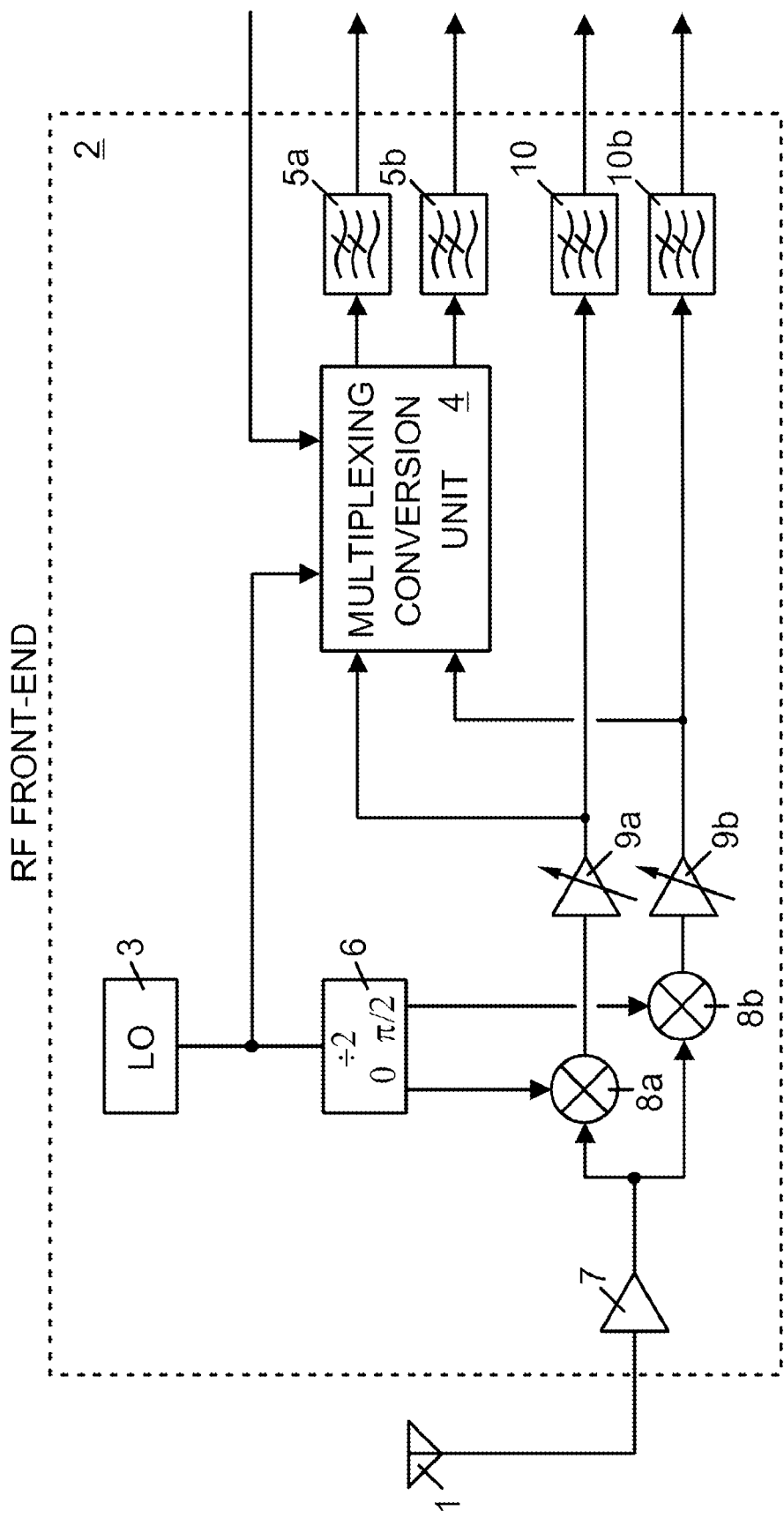
FIG. 1 illustrates an RF front-end of a GNSS receiver according to the disclosure.

Reference in the specification to "one embodiment", "an embodiment", "various embodiments" or "some embodiments" means that a particular feature, structure, or characteristic described in connection with these embodiments is included in at least one embodiment of the invention, and such references in various places in the specification are not necessarily all referring to the same embodiment.

The general method according to the disclosure involves the frequency translation of a radio frequency signal resulting in a first intermediate signal from which a multiplexed second intermediate signal is derived by mixing with a multiplexed conversion signal which consists of consecutive portions where the signal has a fixed conversion frequency in each case. The conversion frequencies are alternately selected from a plurality of conversion frequencies, the conversion signal shifting, with each of them, a specific frequency band of the first intermediate signal—which corresponds to a frequency band of interest in the radio frequency signal—close to a fixed intermediate frequency or its negative such that the signals contained in the frequency bands can be processed alternately in a similar manner.

In various embodiments, for the processing of a signal contained in a certain frequency band of the radio signal which has as a consequence been converted with a specific conversion frequency selected from the plurality of conversion frequencies, the resulting portions of the second intermediate signal, i.e., portions which are the product of a conversion of the first intermediate signal with the same conversion frequency separated by intervening portions converted with different conversion frequencies, are phase coherent with respect to one another. If phase coherence is lost this can in certain applications severely compromise the processing of the signal, in particular, prevent a reliable extraction of data. Phase coherence between portions of the second intermediate signal converted with the same conversion frequency is preserved when portions of the conversion signal pertaining to the same conversion frequency are phase coherent with one another.

In various embodiments, such phase coherence is obtained by allowing a change of conversion frequency only at certain transition instants which are separated from each other by an interval which is in each case a multiple of each of the periods corresponding to the conversion frequencies of the plurality of conversion frequencies. That is, the distance in time between transition instants is always a multiple of complete cycles of a sinusoid, i.e., a sine, cosine or complex exponential, whose frequency is equal to any of the conversion frequencies.

In some embodiments, a method of producing a suitable multiplexed conversion signal comprises deriving the same from a clock signal of constant frequency by alternately dividing the frequency of the clock signal by appropriate divide ratios $L_1, \ldots, L_n$, usually integers, with each selected divide ratio reducing the clock frequency to one of the conversion frequencies.

Changes in the conversion frequency are controlled by a control signal which is also derived from the clock signal in such a way that the frequency of the control signal is the frequency of the clock signal divided by a common multiple of the divide ratios $L_1, \ldots, L_n$, for example, the smallest common multiple. This implies that the period of the control signal is a multiple of each of the periods corresponding to the conversion frequencies. Phase coherence can therefore be preserved by allowing a change of the selected conversion frequency only once during any period of the control signal at a specific point of the cycle, e.g., when a positive zero crossing of the control signal occurs.

In various embodiments, a multiplexed frequency-divided signal is first derived from the clock signal by dividing the frequency of the latter in each case by one of a plurality of integer divisors $N_1, \ldots, N_n$, and then derive the conversion signal from the frequency-divided signal by further dividing its frequency by a common, usually integer, constant K such that each divide ratio is the product of one of the divisors and the constant K, i.e., $L_i=N_i \times K$ for $i=1, \ldots, n$. For example, if the conversion signal is a complex signal, derivation of the same from a real frequency-divided signal usually, although not necessarily, involves division of the frequency of the latter by $K=2$. In any case the smallest common multiple of $L_1, \ldots, L_n$ is the same as the smallest common multiple of K and $N_1, \ldots, N_n$. If K is already contained as a factor in any of the divisors this reduces to the smallest common multiple of the divisors $N_1, \ldots, N_n$.

The embodiment described in the following is a GNSS receiver. However, the method may be used in other devices, e.g., a radio receiver suitable for applications like wireless communication or a signal processing device used, e.g., in a radio receiver, cellular telephone or other apparatus.

The GNSS receiver of the embodiment is suitable for permanently receiving a GPS coarse/acquisition (C/A) (or L1) signal and multiplexing at the same time between two other GNSS signals, in the example, a GLONASS signal and a BeiDou signal. Each of the signals is a superposition of satellite signals where the satellites belong to the GNSS system in question. In the case of GPS, each satellite transmits a Direct Sequence Spread Spectrum (DSSS) signal centered about a carrier frequency of $f_0^G=1,575.42$ MHz, with a bandwidth of 2.046 MHz. GPS uses a Code-Divided Multiple Access (CDMA) system where the carrier is modulated by a pseudo random noise (PRN) binary sequence of 1,023 chips which is characteristic of the satellite and which is repeated every microsecond. The sequence is modulated by data bits in that in each case twenty consecutive PRN sequences are multiplied by either +1 or −1 depending on the value of the data bit. The GLONASS-M L1 signal consists of satellite signals with 14 different carrier frequencies at $1,602 \pm 0.5625n$ where n with $-7 \leq n \leq 6$ is an integer and $f_0^{GL}=1,602$ MHz is a center frequency. The BeiDou B1 signal is again a superposition of signals which are centered at a single carrier frequency $f_0^B=1,561.098$ MHz, with a bandwidth of 4.092 MHz. As in the GPS system, CDMA is used to differentiate signals from different satellites.

Referring to FIG. 1, the GNSS receiver comprises a single antenna 1 and a radio frequency (RF) front-end 2 with an antenna input connected to the antenna 1. The RF front-end 2 comprises a local oscillator 3 generating a clock signal which is delivered to a clock input of a multiplexing conversion unit 4. The latter is followed by low-pass filters 5a,b. A phase shifter 6 also receives the clock signal. A low-noise amplifier 7 is connected to the antenna input and followed by two mixers 8a,b which derive, from the output signal of the low-noise amplifier 7, an in-phase (I) component and a quadrature (Q) component of an analog complex first intermediate signal and are in turn followed by adjustable gain amplifiers 9a;b and low-pass filters 10a;b. Phase shifter 6, mixers 8a,b and adjustable gain amplifiers 9a,b form a frequency-translation unit whose outputs are also connected to signal inputs of the multiplexing conversion unit 4.

Figure 2:
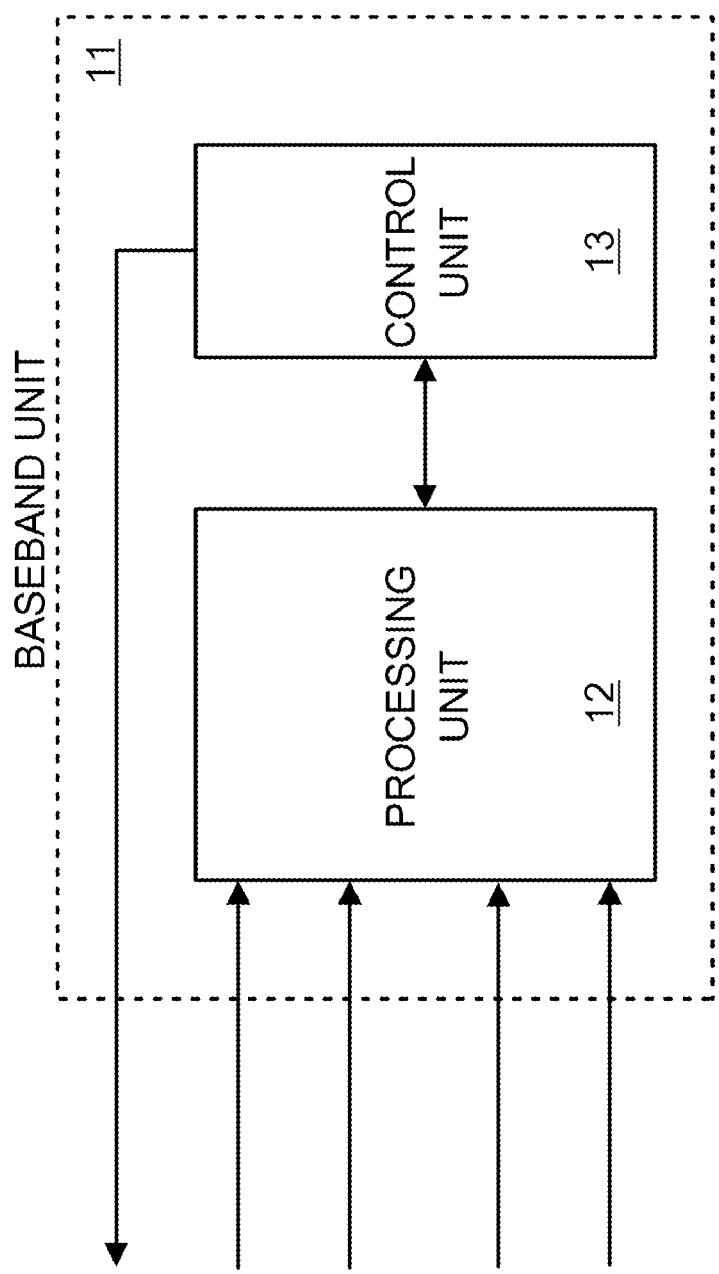
FIG. 2 illustrates a baseband unit of the GNSS receiver according to the disclosure.

Referring to FIG. 2, the GNSS receiver also comprises a baseband unit 11 with a processing unit 12 and a control unit 13.

Figure 3:
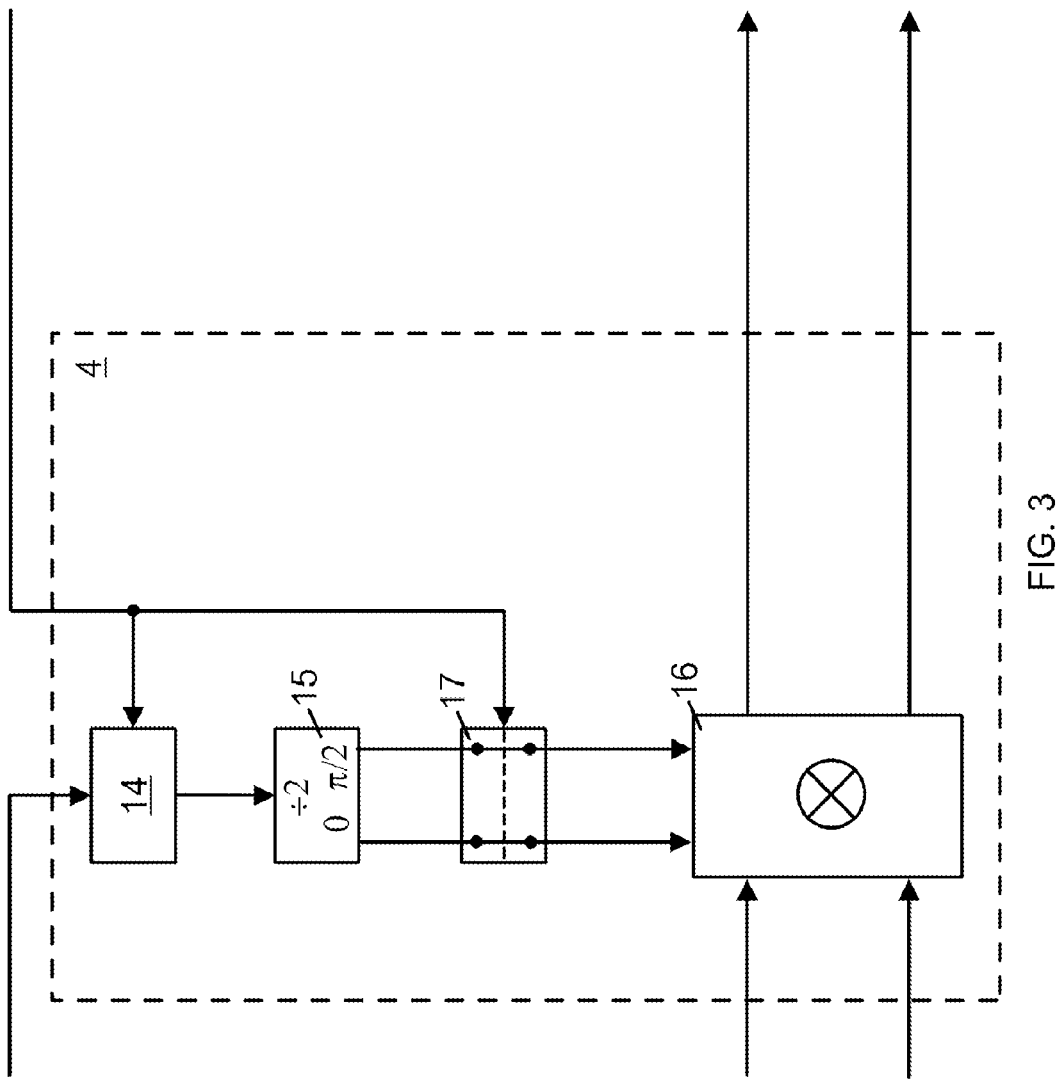
FIG. 3 illustrates a multiplexing conversion unit of the RF front-end according to a first embodiment in a first state.
Figure 4:
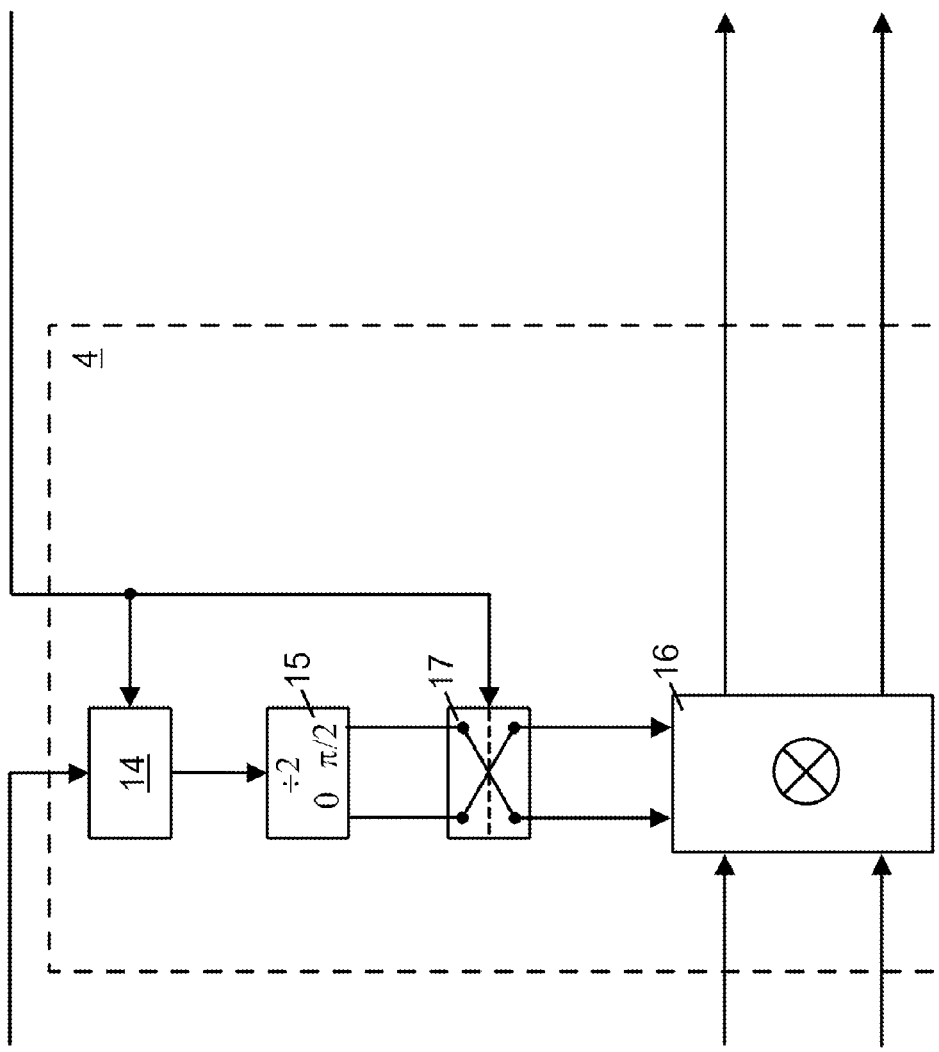
FIG. 4 illustrates the multiplexing conversion unit of FIG. 3 in a second state.

Referring to FIGS. 3 and 4, the multiplexing conversion unit 4 comprises a multiplexing divider circuit 14 which receives the clock signal from the local oscillator 3 via the clock input of multiplexing conversion unit 4 and derives a frequency-divided signal from the same whose frequency is the frequency of the clock signal divided by an integer divisor, a phase shifter 15 which derives from the frequency-divided signal a complex multiplexed conversion signal with, at a first output, an I component and, at a second output, a Q component, both of half the frequency of the frequency-divided signal and a complex conversion mixer 16 with a first input and a second input for the I component and the Q component of the first intermediate signal and a third input and a fourth input which are connected to the phase shifter 15 via a crossover switch 17 capable of connecting either the first output of the phase shifter 15 with the third input of complex mixer 16 and the second output of the phase shifter 15 with the fourth input of complex mixer 16 (FIG. 3) or vice versa (FIG. 4).

Figure 5:
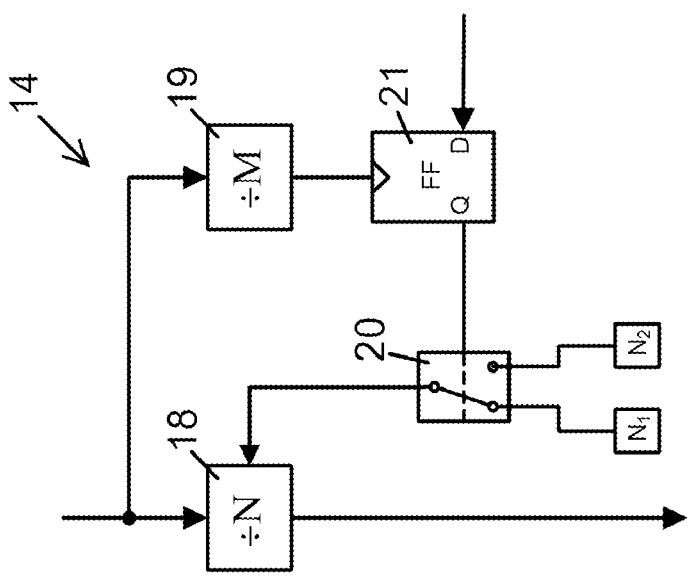
FIG. 5 illustrates a multiplexing divider circuit of the multiplexing conversion unit of FIGS. 3 and 4 according to a first embodiment.

According to a first embodiment the divider circuit 14 has the structure shown in FIG. 5. The divide circuit 14 comprises a conversion divider 18 dividing the frequency of the clock signal by a variable divisor and a controlling divider 19 dividing the same frequency by a fixed integer number. The conversion divider 18 and the controlling divider 19 are both connected to the clock input of the multiplexing conversion unit 4. The divisor of the conversion divider 18 is controlled by a divider switch 20. Depending on the state of the divider switch 20 the divisor is set to either $N_1$ or $N_2$ depending on which one out of a plurality of divide ratios, which in the example consists of $L_1=2N_1$ and $L_2=2N_2$, is selected as the currently selected divide ratio, i.e., the divide ratio which is, during a certain time interval, used to divide the frequency of the clock signal to produce the conversion signal.

The controlling divider 19 divides the frequency of the clock signal by a fixed integer M which is a common multiple, for example, the smallest common multiple, of the divide ratios $L_1$ and $L_2$, to provide a control signal for controlling, together with control unit 13, a flip-flop 21. The flip-flop 21 forms, together with the controlling divider 19, a control circuit controlling the divider switch 20.

Figure 6:
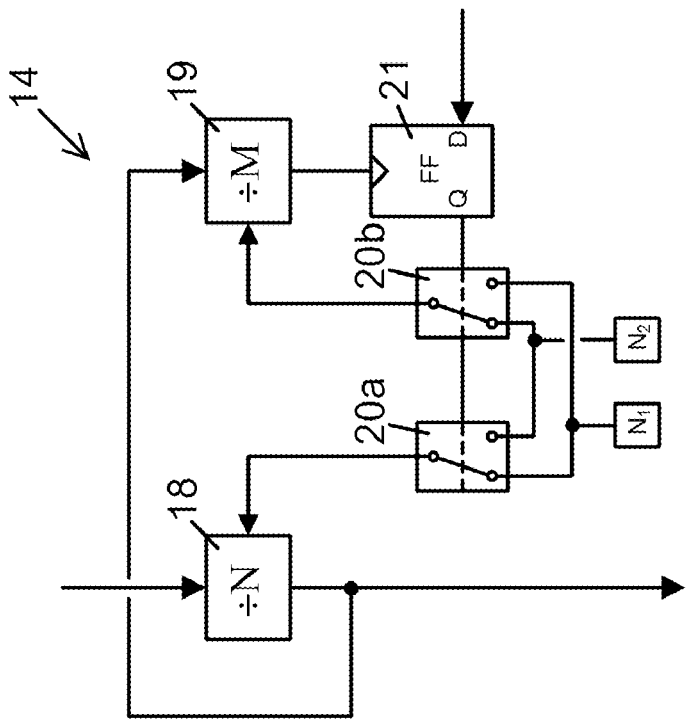
FIG. 6 illustrates a multiplexing divider circuit of the multiplexing conversion unit of FIGS. 3 and 4 according to a second embodiment.

According to a second embodiment (FIG. 6), the divider circuit 14 again comprises a conversion divider 18 and a controlling divider 19, each with a variable divisor, and divider switches 20a, 20b. The input of the controlling divider 19 is connected to the output of conversion divider 18. A flip-flop 21 is controlled by the control unit 13 and controlling divider 19 and in turn controls the divider switches 20a, 20b. The state of the divider switches 20a, 20b determines whether the divisor used by the conversion divider 18 equals, as shown in FIG. 6, $N_1$ or whether it equals $N_2$. The controlling divider 19 uses the remaining one of the pair of divisors, i.e., if the currently selected divisor is $N_1$ the controlling divider uses $N_2$ as its divisor and vice versa.

The frequency of the control signal produced by controlling divider 19 is in each case the frequency of the clock signal divided by the product of $N_1$ and $N_2$ which, if $N_1$ or $N_2$ is an even number, is the smallest common multiple of the divide ratios $L_1=2N_1$ and $L_2=2N_2$ or a multiple thereof. If $N_1$ and $N_2$ are both odd numbers the smallest common multiple of the divide ratios $L_1$ and $L_2$ is twice the smallest common multiple of $N_1$ and $N_2$ and the frequency of the clock signal is additionally divided by 2. As the frequency of the input signal of the controlling divider 19 is smaller than the clock signal by a factor of $N_1$ power consumption of the divider circuit according to the second embodiment is considerably reduced in comparison with the divider circuit according to the first embodiment.

In some embodiments, the multiplexing divider circuit comprises two dividers each with fixed divisors $N_1$, $N_2$ where in each case one of the dividers acts as the conversion divider, producing the multiplexed conversion signal, and the other one as the controlling divider, producing the control signal.

Figure 8:
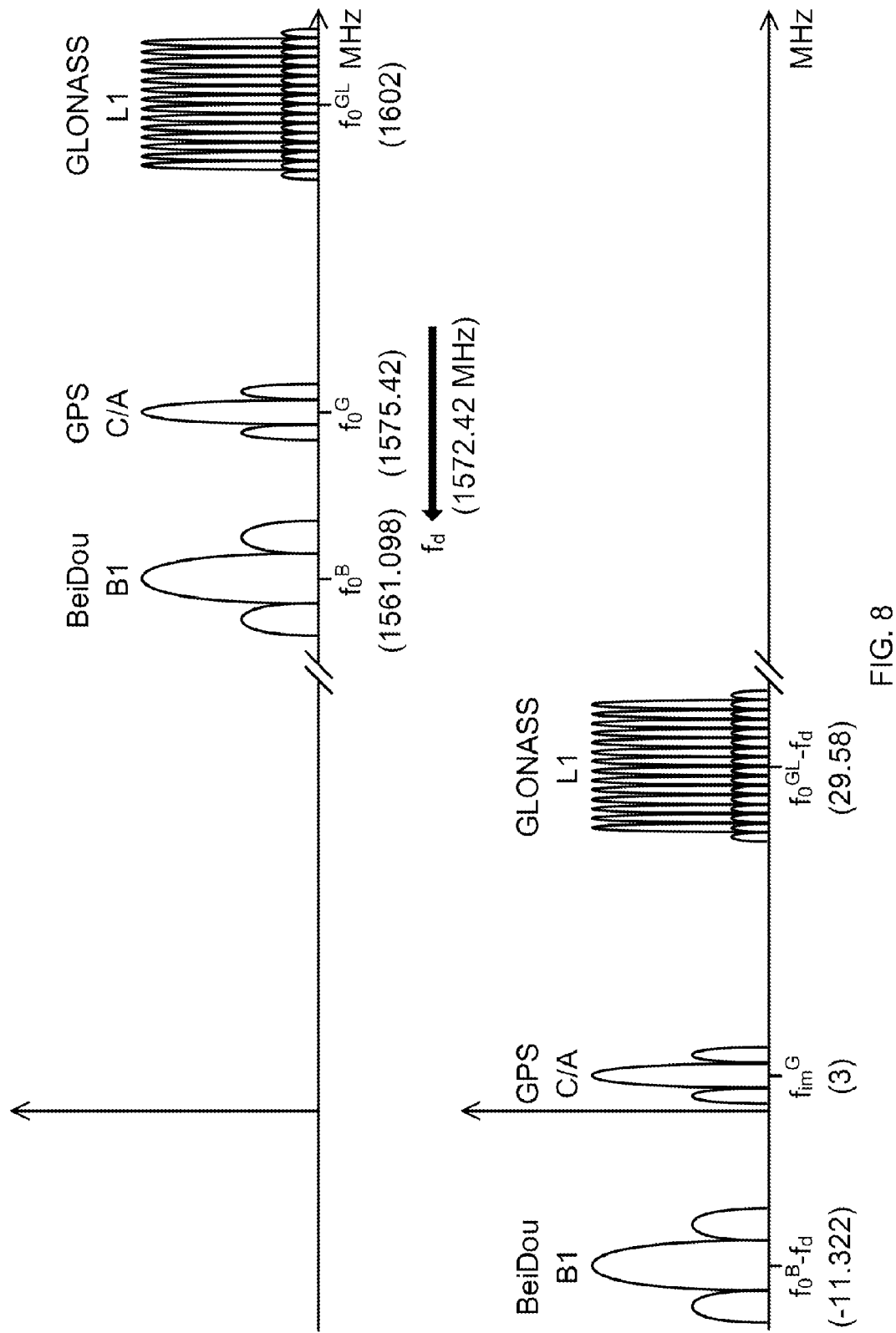
FIG. 8 illustrates a diagram showing a frequency translation of a radio frequency signal containing frequency bands of interest to form a first intermediate signal.

In the example, the clock signal generated by local oscillator 3 is a sinusoid with a constant frequency of $F_d$=3,144.84 MHz. In phase shifter 6 the clock signal is converted to cosine and sine signals with frequencies of $f_d=F_d/2$=1,572.42 MHz, yielding a complex frequency-translation signal. In mixers 8a,b the radio frequency signal received by antenna 1 and amplified by low-noise amplifier 7 is mixed with the complex frequency-translation signal and thereby frequency-translated by $-f_d$ and converted to an analog first intermediate signal, a complex signal with an I component and a Q component. FIG. 8 shows, in the upper diagram, the radio frequency signal with frequency bands of interest, i.e., a GPS frequency band, a GLONASS frequency band and a BeiDou frequency band. The lower diagram shows the first intermediate signal which results from the frequency-translation of the radio frequency signal.

The GPS center frequency corresponds, in the first intermediate signal, to a GPS intermediate frequency $f_{im}^{G}=f_0^{G}-f_d$=3 MHz. High frequency components are later eliminated by the low-pass filters 10a,b. The first intermediate signal is fed to processing unit 12 of baseband unit 11 where the first intermediate signal is converted to digital and processed in ways which are well known in the art and are explained, e.g., in the above-referenced European Patent Application EP 1 983 351 A1.

The GLONASS center frequency $f_0^{GL}$=1,602 MHz corresponds, in the first intermediate signal, to $f_0^{GL}-f_d$=29.58 MHz and the BeiDou center frequency $f_0^{B}$=1,561.098 to $f_0^{B}-f_d$=−11.322 MHz.

In the multiplexing conversion unit 4 the first intermediate signal is converted to an analog multiplexed second intermediate signal in that the center frequencies of the frequency bands which result from the frequency-translation of the GLONASS and the BeiDou frequency bands of the radio frequency signal are alternately shifted approximately to the GPS intermediate frequency of $f_{im}^{G}$=3 MHz by mixing with a multiplexed complex conversion signal which alternately assumes two different conversion frequencies, in conversion mixer 16. The resulting multiplexed second intermediate signal is then filtered by low-pass filters 5a,b and processed in the processing unit 12 together with the first intermediate signal filtered by low-pass filters 10a,b.

A multiplexed frequency-divided signal is produced in multiplexing divider circuit 14 where $N_1$=60 and $N_2$=107 are chosen as divisors. From the frequency-divided signal the complex multiplexed conversion signal with a conversion frequency which is half the frequency of the frequency-divided signal is then derived in phase shifter 15. The overall divide ratios are therefore $L_1=2N_1$ and $L_2=2N_2$, making up a plurality of divide ratios from which a currently selected divide ratio is selected in each case. By mixing the first intermediate signal with the conversion signal in conversion mixer 16 a second intermediate signal is produced which is, with respect to the first intermediate signal, shifted in the frequency domain by the conversion frequency of the conversion signal.

Figure 9:
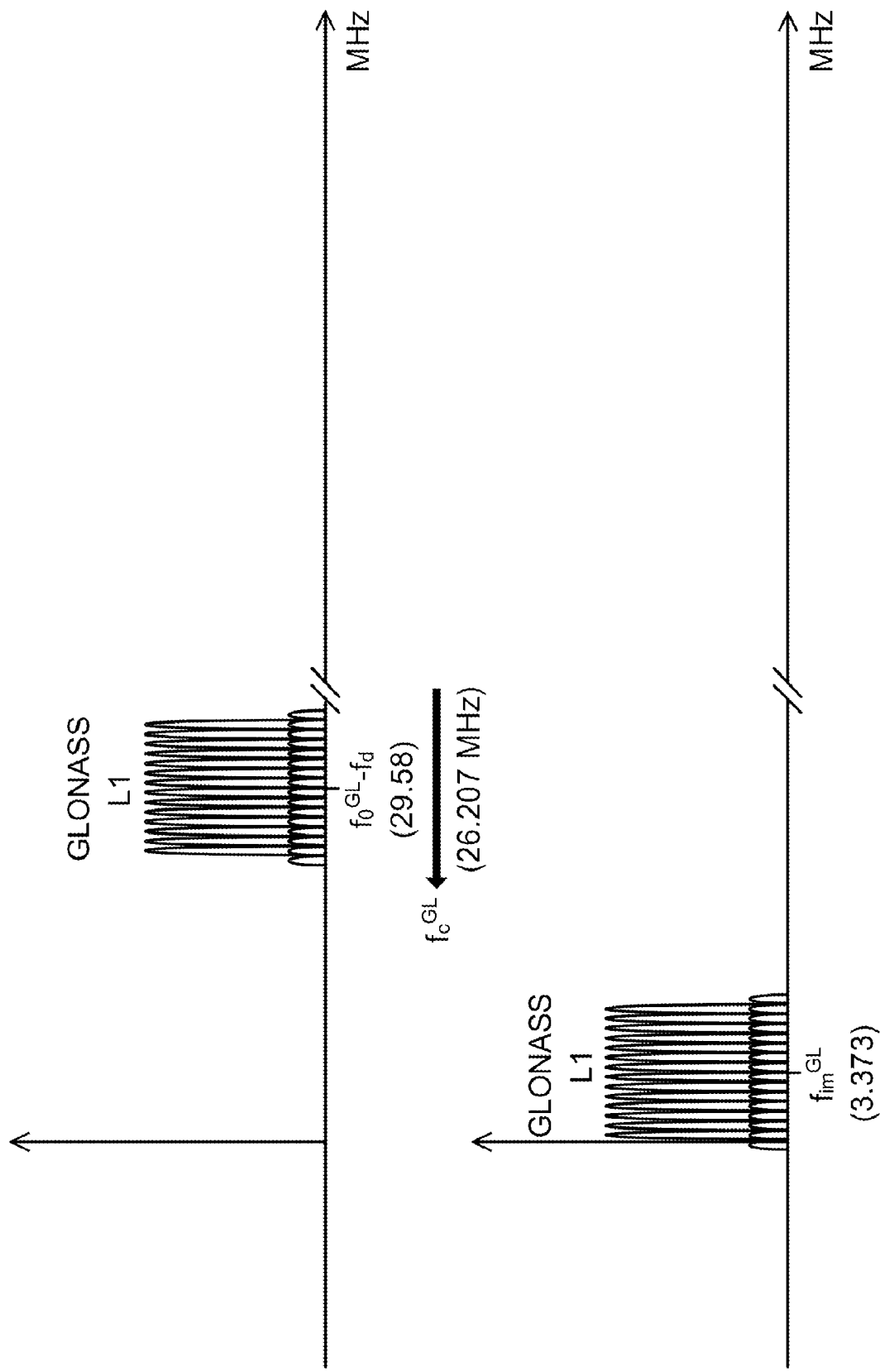
FIG. 9 illustrates a diagram showing a conversion of the first intermediate signal shifting a center frequency of a first frequency band of interest close to an intermediate frequency.

In order to bring the frequency in the second intermediate signal which corresponds to the GLONASS center frequency $f_0^{u}$ in the radio frequency signal close to the GPS intermediate frequency $f_{im}^{G}$, $N_1$ is selected as a divisor which implies that $L_1=2N_1$ is the currently selected divide ratio. Conversion divider 18 of divider circuit 14 derives from the clock signal the frequency-divided signal with a frequency $F_c^{GL}=F_d/N_1$=52.414 MHz. Phase shifter 15 derives from this signal a complex conversion signal with a GLONASS conversion frequency $f_c^{GL}=F_c^{GL}/2=F_d/2N_1$=26.207 MHz. The second intermediate signal is derived from the first intermediate signal in conversion mixer 16 by a downward shift of the latter in the frequency domain by $f_c^{GL}$. The frequency corresponding, in the second intermediate signal, to the GLONASS center frequency $f_0^{GL}$ in the radio frequency signal is therefore $f_{im}^{GL}=f_0^{GL}-f_d-f_c^{GL}$=3.373 MHz. This is illustrated in FIG. 9 where the upper diagram shows the frequency band of the first intermediate signal which corresponds to the GLONASS frequency band and the lower diagram shows the second intermediate signal corresponding to the same frequency band where the first intermediate signal has been converted with the GLONASS conversion frequency $f_c^{GL}=26.207$ MHz.

To shift the frequency corresponding, in the second intermediate signal, to the center frequency $f_0^B$ of the BeiDou signal in the radio frequency signal to a frequency close to the GPS intermediate frequency $f_{im}^G$, $N_2$ is selected as a divisor and, as a consequence, $L_2=2N_2$ is the currently selected divide ratio. Conversion divider 18 of the divider circuit 14 then derives from the clock signal the frequency-divided signal which in this case has a frequency $F_c^B=F_d/N_2=29.392$ MHz and is converted to the complex conversion signal with a BeiDou conversion frequency $f_c^B=F_c^B/2=F_d/2N_2=14.696$ MHz by phase shifter 15. As cross-over switch 17 swaps the connections between the first output and the second output of the phase shifter 15 with the third input and the fourth input of the conversion mixer 16—which amounts to swapping the I component and the Q component of the conversion signal—the conversion frequency is inverted and the conversion mixer 16 shifts the first intermediate signal upwards to yield the second intermediate signal.

Figure 10:
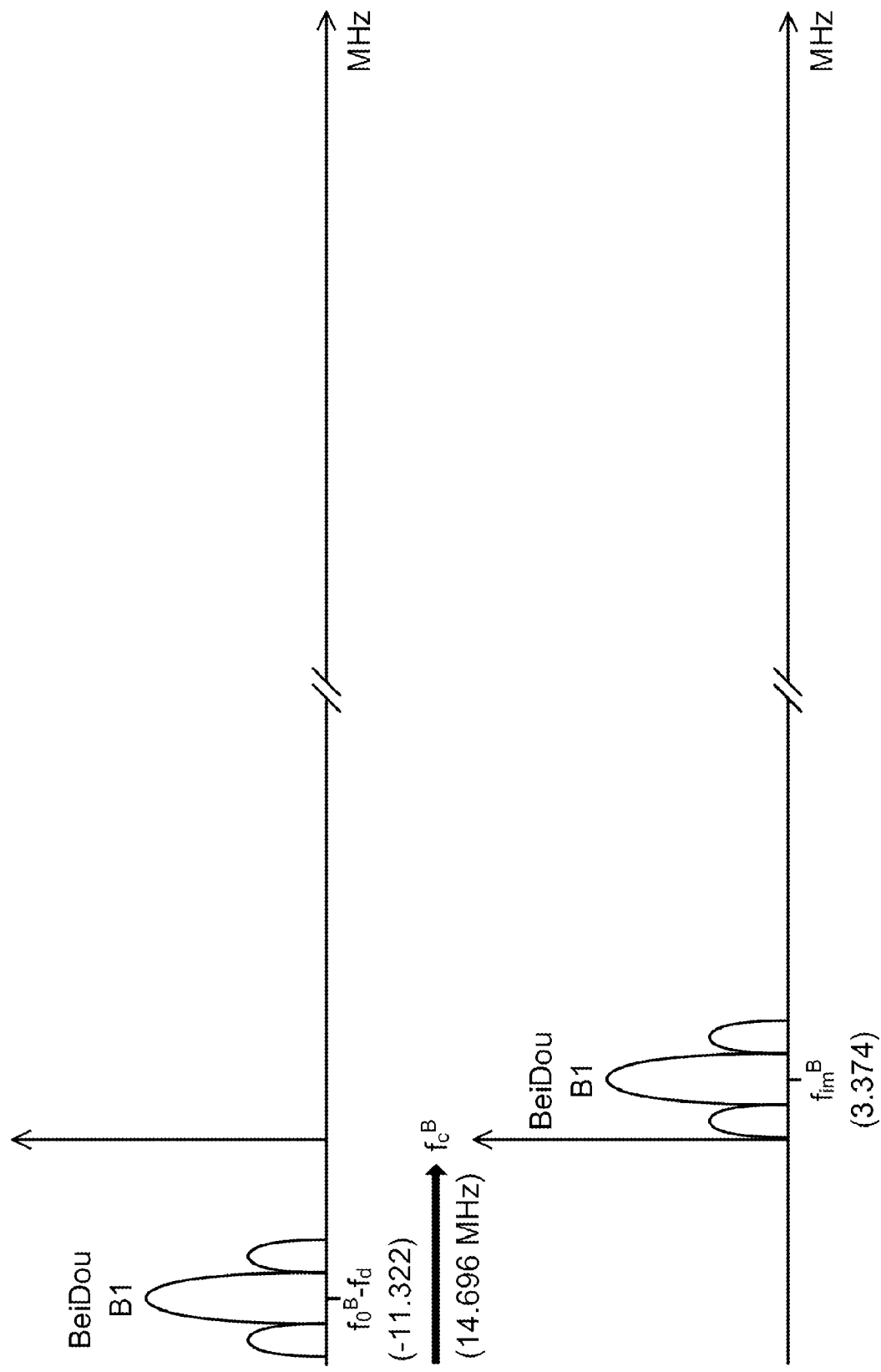
FIG. 10 illustrates a diagram showing a conversion of the first intermediate signal shifting a center frequency of a second frequency band of interest close to an intermediate frequency.

As a consequence the frequency corresponding, in the second intermediate signal, to the BeiDou center frequency $f_0^B$ in the radio frequency signal, is $f_{im}^B=f_0^B-f_d+f_c^B=3.374$ MHz. The polarity of the conversion signal is changed at the same time which carries over to the resulting second intermediate signal but this is irrelevant for the further evaluation of the latter. The conversion of the first intermediate signal with the BeiDou conversion frequency $f_c^B=14.696$ MHz is shown in FIG. 10 which is analogous to FIG. 9.

Regarding the derivation of the multiplexed conversion signal from the clock signal both embodiments of the divider circuit 14 work in the same way, producing a multiplexed frequency-divided signal alternating between the GLONASS and BeiDou conversion frequencies $f_c^{GL}$ and $f_c^B$. In some embodiments, portions of the second intermediate signal shifted by the GLONASS conversion frequency $f_c^{GL}$ which are separated by a portion shifted by the BeiDou conversion frequency $f_c^B$ are phase coherent with one another. The same applies, of course, to portions of the intermediate signal shifted by the BeiDou conversion frequency $f_c^B$ which are separated by an intervening portion shifted by the GLONASS conversion frequency $f_c^{GL}$. In some embodiments, to ensure this phase coherence portions of the conversion signal having the same conversion frequency are phase coherent. This is achieved by allowing a change of the currently selected divide ratio only at certain transition instants, with consecutive transition instants separated by an interval which consists of complete cycles of both the GLONASS conversion signal and of the BeiDou conversion signal.

Where ensuring phase coherence is concerned, the two embodiments of divider circuit 14 work in slightly different ways. The flip-flop 21 and the controlling divider 19 control the divider switch 20 (FIG. 5) or the divider switches 20a,b (FIG. 6) in such a way that the change of the currently selected divide ratio is only allowed at transition instants which satisfy the above condition. As explained above, the controlling divider 19 derives, from the clock signal or from the frequency-divided signal, respectively, a control signal whose frequency is the frequency of the clock signal divided by a common multiple of the divide ratios $L_1$ and $L_2$, that is, the length of the cycle of the control signal is a multiple of the length of the cycle of the GLONASS conversion signal as well as of the cycle of the BeiDou conversion signal.

When flip-flop 21 receives at input D a command to change the currently selected divide ratio from the control unit 13 the command is registered but its execution suspended until the control signal from controlling divider 19 exhibits, e.g., a rising edge indicating that at least one complete cycle of the control signal has passed since the last transition instant and a change of the currently selected divide ratio is therefore allowed. As soon as the edge appears the signal at output Q of flip-flop 21 changes which causes the state of the divider switch 20 (first embodiment, FIG. 5) or of the divider switches 20a,b (second embodiment, FIG. 6) to change according to the command from control unit 13. In the first case only the currently selected divisor of conversion divider 18 changes from $N_1$ to $N_2$ or from $N_2$ to $N_1$ whereas the operation of controlling divider 19 does not change and the frequency of the control signal remains equal to the frequency $F_d$ of the clock signal divided by the fixed integer M which will usually be chosen to be the smallest common multiple of the divide ratios $L_1$ and $L_2$; in the example $M=N_1\times N_2$. In the second case the divisor of controlling divider 19 changes from $N_2$ to $N_1$ or from $N_1$ to $N_2$ at the same time as the divisor of the conversion divider 18 changes from $N_1$ to $N_2$ or from $N_2$ to $N_1$, respectively. Here, too, the frequency of the control signal remains equal to the frequency $F_d$ of the clock signal divided by $N_1 \times N_2$.

Many modifications of the embodiment are possible without leaving the ambit of the invention. It is possible to swap the I and Q components of the first intermediate signal instead of the I and Q components of the conversion signal, with the cross-over switch 17 placed in the signal path upstream of conversion mixer 16 as shown in FIG. 7. This would lead to a second intermediate signal of negative frequency in the BeiDou case but this would have no consequences for the processing of the signal in the baseband unit 11. Otherwise the effect may be compensated by a second cross-over switch downstream of the conversion mixer 16 which is controlled in parallel with the first cross-over switch.

It is equally possible to invert the polarity of one of the components of either the conversion signal or the first intermediate signal instead of swapping the I and Q components. The cross-over switch would then have to be replaced by a polarity inverter in one of the connections between the phase shifter 15 and the conversion mixer 16 or in one of the lines connecting the conversion mixer 16 with the signal inputs of the multiplexing conversion unit 4.

It is, of course, also possible to use a plurality of divide ratios comprising three or more different divide ratios from which the currently selected divide ratio is selected in each case. Appropriate adaptations of the divider circuit are straightforward. It is equally possible to choose an integer constant K relating the divisors $N_i$ of the divider circuit to the divide ratios $L_i$ by $L_i=K\times N_i$ which is different from 2, i.e., the phase shifter downstream of the divider circuit can be configured to divide the frequency of the frequency-divided signal by a constant K which is not equal to 2 or can be replaced by a frequency-divider dividing the frequency of the frequency-divided signal further by such constant K. K may also be equal to one, i.e., the phase shifter may be omitted or a different type of phase shifter may be used which derives a complex conversion signal from the frequency-divided signal without a change of frequency.

LIST OF REFERENCE SYMBOLS 1. antenna
2 RF front-end
3 local oscillator
4 multiplexing conversion unit
5a,b low-pass filters
6 phase shifter
7 low-noise amplifier 8a,b mixers
9a,b adjustable gain amplifiers
10a,b low-pass filters
11 baseband unit
12 processing unit
13 control unit
14 divider circuit
15 phase shifter
16 conversion mixer
17 cross-over switch
18 conversion divider
19 controlling divider
20 divider switch
20a,b divider switches
21 flip-flop While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method of processing a radio frequency signal, the method comprising:
    deriving, from the radio frequency signal, an analog first intermediate signal by frequency translating the radio frequency signal by mixing the radio frequency signal with a frequency translation signal, and
    deriving, from the first intermediate signal, a multiplexed second intermediate signal by mixing the first intermediate signal with a conversion signal which alternately assumes a plurality of conversion frequencies, where portions of the conversion signal having the same conversion frequency are phase coherent with respect to one another.

2. The method of claim 1, wherein the conversion signal is derived from a clock signal by alternately dividing the frequency of the clock signal by a plurality of divide ratios which change at transition instants, with consecutive transition instants being in each case separated by a number of cycles of the clock signal which is a common multiple of the divide ratios.

3. The method of claim 2, wherein a frequency-divided signal is derived from the clock signal by alternately dividing the frequency of the clock signal by a plurality of divisors, each of the divisors related to one of the divide ratios by a fixed constant, which change at the transition instants and the conversion signal is derived from the frequency-divided signal in that the frequency of the same is divided by the constant.

4. The method of claim 2, wherein the frequency of the clock signal is in each case divided by a currently selected divide ratio selected from the plurality of divide ratios to provide the conversion signal and a control signal for allowing a change of the currently selected divide ratio is derived from the clock signal in that the frequency of the clock signal is divided by a common multiple of the plurality of divide ratios.

5. The method of claim 3, wherein the frequency of the clock signal is in each case divided by a currently selected divisor selected from the plurality of divisors to provide the frequency-divided signal and a control signal for allowing a change of the currently selected divide ratio is derived from the frequency-divided signal where the frequency of the frequency-divided signal is divided by the product of the remaining divisors of the plurality of divisors.

6. The method of claim 1, wherein the first intermediate signal and the conversion signal are both complex signals, each with an I component and a Q component, and the mixing is a complex mixing where the I component and the Q component of the first intermediate signal interact with the I component and the Q component of the conversion signal.

7. The method of claim 2, wherein the first intermediate signal and the conversion signal are both complex signals, each with an I component and a Q component, and the mixing is a complex mixing where the I component and the Q component of the first intermediate signal interact with the I component and the Q component of the conversion signal, wherein for at least one divide ratio of the plurality of divide ratios the conversion signal is subjected to an inversion of its frequency.

8. The method of claim 7, wherein the inversion involves interchanging roles of the I component and the Q component of the conversion signal.

9. The method of claim 7, wherein the inversion involves inverting the polarity of either the I component or the Q component of the conversion signal.

10. The method of claim 2, wherein the first intermediate signal and the conversion signal are both complex signals, each with an I component and a Q component, and the mixing is a complex mixing where the I component and the Q component of the first intermediate signal interact with the I component and the Q component of the conversion signal, wherein for at least one divide ratio of the plurality of divide ratios the first intermediate signal is subjected to an inversion of its frequency before the first intermediate signal is mixed with the conversion signal.

11. The method of claim 10, wherein the inversion involves interchanging roles of the I component and the Q component of the first intermediate signal.

12. A signal processing device comprising:
    a local oscillator for providing a clock signal,
    a frequency-translation unit for mixing a radio frequency signal with a frequency-translation signal derived from the clock signal to provide an analog first intermediate signal, and
    a multiplexing conversion unit having a conversion mixer configured to convert the first intermediate signal to a multiplexed second intermediate signal by mixing the first intermediate signal with a conversion signal which alternately assumes a plurality of different conversion frequencies.

13. The device of claim 12, wherein the multiplexing conversion unit comprises a divider circuit for deriving, from the clock signal, a frequency-divided signal from which the conversion signal can be derived dividing its frequency by a fixed constant, by alternately dividing the frequency of the clock signal by a plurality of divisors, each of the divisors related to one of a plurality of divide ratios by the said constant, the divider circuit comprising in each case a conversion divider for dividing the frequency of the clock signal by a currently selected divisor selected from the plurality of divisors and a control circuit for providing a control signal allowing the conversion divider to change the currently selected divisor when the number of cycles of the clock signal which has elapsed since a previous change is a common multiple of the plurality of divide ratios.

14. The device of claim 13, wherein the conversion divider is a divider switchable between the plurality of divisors and the control circuit comprises a controlling divider configured to receive the clock signal in parallel with the conversion divider and divide the frequency of the clock signal by a common multiple of the divide ratios to provide the control signal.

15. The device of claim 13, wherein the divider circuit comprises a plurality of dividers, each of the divisors suitable for dividing the frequency of a periodic signal by one of the plurality of divisors, where in each case one of the dividers is configured as the conversion divider, receiving the clock signal and deriving the frequency-divided signal, from which the conversion signal is in turn derived, from the clock signal by dividing its frequency by the currently selected divisor, while the remaining dividers are sequentially configured so as to pertain to the control circuit, receiving the frequency-divided signal and dividing its frequency by the product of the remaining divisors of the plurality of divisors.

16. The device of claim 13, wherein the frequency-translation signal, the first intermediate signal and the second intermediate signal are complex signals, each with an I component and a Q component and the frequency-translation unit comprises two mixers, a first mixer for providing, at a first output of the frequency translation unit, the I component of the first intermediate signal by mixing the radio frequency signal with the I component of the frequency-translation signal and a second mixer for providing, at a second output of the frequency-translation unit, the Q component of the first intermediate signal by mixing the radio frequency signal with the Q component of the frequency-translation signal, the divider circuit is configured to produce a frequency-divided signal and a phase shifter is provided for deriving, from the frequency-divided signal, a complex conversion signal consisting of an I component at a first output and of a Q component at a second output of the phase shifter and the conversion mixer is a complex mixer with a first input and a second input each for receiving one of the I component and the Q component of the first intermediate signal and a third input and a fourth input each for receiving one of the I component and the Q component of the complex conversion signal.

17. The device of claim 16, wherein the multiplexing conversion unit further comprises a cross-over switch for selectively connecting either the first output of the phase shifter with the third input of the conversion mixer and the second output of the phase shifter with the fourth input of the conversion mixer or the first output of the phase shifter with the fourth input of the conversion mixer and the second output of the phase shifter with the third input of the conversion mixer.

18. The device of claim 16, wherein the multiplexing conversion unit further comprises a cross-over switch for selectively connecting either the first output of the frequency-translation unit with the first input of the conversion mixer and the second output of the frequency-translation unit with the second input of the conversion mixer or the first output of the frequency-translation unit with the second input of the conversion mixer and the second output of the frequency-translation unit with the first input of the conversion mixer.

19. A radio frequency front-end for a radio receiver, with an input for a radio signal, the radio frequency front-end comprising a signal processing device configured to process a radio frequency signal derived from the radio signal, wherein the signal processing device comprises:
   a local oscillator for providing a clock signal,
   a frequency-translation unit for mixing a radio frequency signal with a frequency-translation signal derived from the clock signal to provide an analog first intermediate signal, and
   a multiplexing conversion unit having a conversion mixer configured to convert the first intermediate signal to a multiplexed second intermediate signal by mixing the first intermediate signal with a conversion signal which alternately assumes a plurality of different conversion frequencies.

20. A radio receiver comprising a radio frequency front-end with an input for a radio signal, the radio frequency front-end comprising a signal processing device configured to process a radio frequency signal derived from the radio signal, wherein the signal processing device comprises:
   a local oscillator for providing a clock signal,
   a frequency-translation unit for mixing a radio frequency signal with a frequency-translation signal derived from the clock signal to provide an analog first intermediate signal, and
   a multiplexing conversion unit having a conversion mixer configured to convert the first intermediate signal to a multiplexed second intermediate signal by mixing the first intermediate signal with a conversion signal which alternately assumes a plurality of different conversion frequencies, the radio receiver further comprising a baseband unit for processing signals derived from the first intermediate signal and the multiplexed second intermediate signal of the signal processing device.

21. A GNSS receiver comprising a radio receiver which comprises a radio frequency front-end with an input for a radio signal, the radio frequency front-end comprising a signal processing device configured to process a radio frequency signal derived from the radio signal, wherein the signal processing device comprises:
   a local oscillator for providing a clock signal,
   a frequency-translation unit for mixing a radio frequency signal with a frequency-translation signal derived from the clock signal to provide an analog first intermediate signal, and
   a multiplexing conversion unit having a conversion mixer configured to convert the first intermediate signal to a multiplexed second intermediate signal by mixing the first intermediate signal with a conversion signal which alternately assumes a plurality of different conversion frequencies comprising a first conversion frequency suitable for shifting a first frequency band contained in the first intermediate signal which corresponds to a frequency band in the radio signal which is centered at a GLONASS center frequency of 1602 MHz to a frequency band centered at an intermediate frequency and a second conversion frequency suitable for shifting a second frequency band contained in the first intermediate signal which corresponds to a frequency band in the radio signal which is centered at a BeiDou center frequency of 1,561.098 MHz to a frequency band centered at the intermediate frequency or at the inverted intermediate frequency, the radio receiver further comprising a baseband unit for processing signals derived from the first intermediate signal and the multiplexed second intermediate signal of the signal processing device.

\* \* \* \* \*